United States Patent
Ottman

(10) Patent No.: US 12,147,296 B1
(45) Date of Patent: Nov. 19, 2024

(54) USING MULTIPLE NAME SPACES FOR ANALYZING TESTING DATA FOR TESTING SCENARIOS INVOLVING INFORMATION TECHNOLOGY ASSETS

(71) Applicant: Dell Products L.P., Round Rock, TX (US)

(72) Inventor: Tadd V. Ottman, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/318,990

(22) Filed: May 17, 2023

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0793* (2013.01)

(58) Field of Classification Search
CPC .............. G06F 11/079; G06F 11/0709; G06F 11/0793; G06F 11/0778; G06F 11/366; G06F 11/368; G06F 11/3684; G06F 11/3692
See application file for complete search history.

(56) References Cited

FOREIGN PATENT DOCUMENTS

CN    113010342 A  *  6/2021   .......... G06F 11/0712

OTHER PUBLICATIONS

Dell Technologies, "Dell EMC PowerStore Storage Family," Spec Sheet H18143.2.4, Apr. 2023, 9 pages.
Dell Technologies, "Empowering DevOps Teams End to End Across the IT Infrastructure," Feb. 2022, 3 pages.
Dell Technologies, "Dell PowerStore T Model Specifications," Spec Sheet, Apr. 2023, 9 pages.
Dell Inc., "Assure Testing Services," E445, Aug. 2011, 4 pages.
Dell Technologies, "Apex," Jul. 2020, 10 pages.

* cited by examiner

*Primary Examiner* — Katherine Lin
(74) *Attorney, Agent, or Firm* — Ryan, Mason & Lewis, LLP

(57) ABSTRACT

An apparatus comprises a processing device configured to obtain a testing data set associated with a test scenario comprising a configuration phase and execution of test suites, the testing data set comprising a first portion generated from the configuration phase and additional portions generated from execution of the test suites. The processing device is also configured to generate a first data structure based on analyzing the first portion of the testing data set in a first namespace, and to insert at least a portion of the first data structure into additional namespaces each comprising a corresponding one of the additional portions of the testing data set generated from execution of one of the test suites. The processing device is further configured to generate additional data structures based on analyzing the additional portions of the testing data set and the inserted components of the first data structure in the additional namespaces.

20 Claims, 9 Drawing Sheets

```
# Process the top-level support-materials directory first, then others
# Top-level global xray detail JSON file gets copied to each service-data directory
   xray_global_json = mdt_dir + "/wangdu/xray_detail.json"

# Prepend _TOP token to the list or assign to a missing list
   if ps_dir_ll is None:
      ps_dir_ll = ["_TOP"]
   else:
      ps_dir_ll[:0] = ["_TOP"]
   print("In lib/pia.py after prepending: {}".format(str(ps_dir_ll)))
   for ps_dir in ps_dir_ll:
      if "_TOP" in ps_dir:
         full_ps_dir = mdt_dir
      else:
         full_ps_dir = mdt_dir + "/" + ps_dir
      try:
         shutil.copy(xray_global_json, full_ps_dir + "/xray_detail_global.json")
      except:
         print("Pia could not copy xray_detail_global.json from {} to {}".format(xray_global_json, full_ps_dir))
```

```
# The global symptom dictionary may hold results from symptom scans in a prior name space.
# A prior symptom match has is_true is True and a blob.
# If is_true, then do not overwrite a prior blob; extend it and return the extended blob.

global symptom_dd
    item = symptom_dd[sym_name]

# Prior symptom True
    if item['is_true']:
        # If nothing matched here
        if log_list is None:
            return item['blob']
        # Else extend match here with prior blob
        return log_list.extend(item['blob'])

# Prior symptom False or no prior scan
    item['blob'] = log_list
    if item['blob'] is not None:
        item['is_true'] = True
    return log_list
```

FIG. 5B

USING MULTIPLE NAME SPACES FOR ANALYZING TESTING DATA FOR TESTING SCENARIOS INVOLVING INFORMATION TECHNOLOGY ASSETS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD

The field relates generally to information processing, and more particularly to device management of information processing systems.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for using multiple namespaces for analyzing testing data for testing scenarios involving information technology assets.

In one embodiment, an apparatus comprises at least one processing device comprising a processor coupled to a memory. The at least one processing device is configured to obtain a testing data set associated with a test scenario for one or more information technology assets, the test scenario comprising a configuration phase and execution of one or more test suites, the testing data set comprising a first portion generated from the configuration phase and one or more additional portions generated from execution of the one or more test suites. The at least one processing device is also configured to generate a first data structure based at least in part on analyzing the first portion of the testing data set in a first namespace against one or more dictionaries of symptoms and diagnoses, and to insert at least one or more components of the first data structure into one or more additional namespaces, each of the one or more additional namespaces comprising a corresponding one of the one or more additional portions of the testing data set generated from execution of one of the one or more test suites. The at least one processing device is further configured to generate one or more additional data structures based at least in part on analyzing the one or more additional portions of the testing data set and the inserted one or more components of the first data structure in the one or more additional namespaces against the one or more dictionaries of symptoms and diagnoses. The at least one processing device is further configured to diagnose one or more issues encountered on the one or more information technology assets during the test scenario based at least in part on the generated first and one or more additional data structures, and to perform one or more remedial actions on the one or more information technology assets based at least in part on the diagnosed one or more issues.

These and other illustrative embodiments include, without limitation, methods, apparatus, networks, systems and processor-readable storage media.

BRIEF DESCRIPTION OF THE DRAWINGS

FIGS. 5A and 5B shows pseudocode for performing testing using suite-level analysis in a second namespace in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
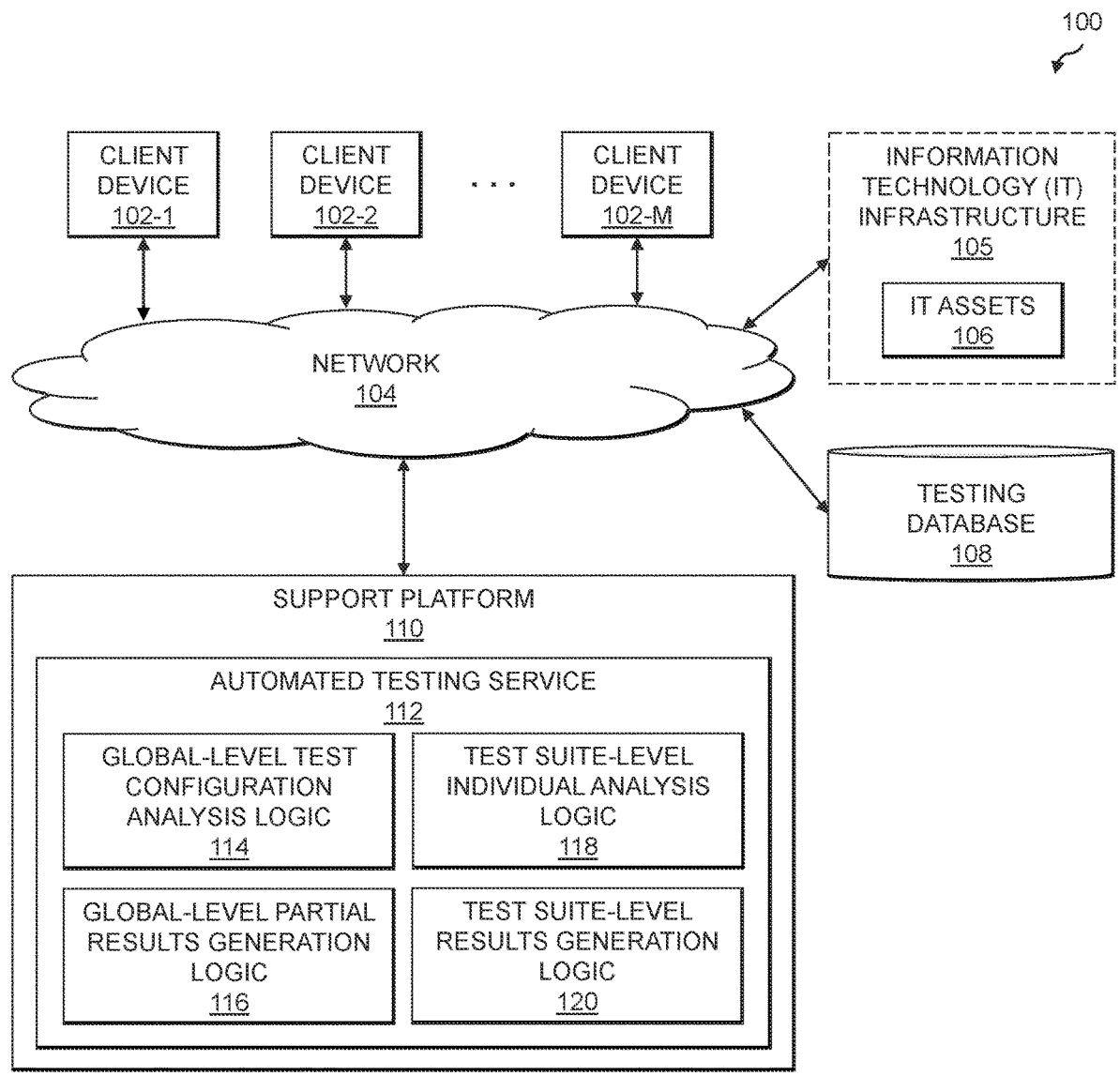
FIG. 1 is a block diagram of an information processing system configured for using multiple namespaces for analyzing testing data for testing scenarios involving information technology assets in an illustrative embodiment.

FIG. 1 shows an information processing system 100 configured in accordance with an illustrative embodiment. The information processing system 100 is assumed to be built on at least one processing platform and provides functionality for using multiple namespaces for analyzing testing data for testing scenarios involving information technology (IT) assets. The information processing system 100 includes a set of client devices 102-1, 102-2, . . . 102-M

(collectively, client devices 102) which are coupled to a network 104. Also coupled to the network 104 is an IT infrastructure 105 comprising one or more IT assets 106, a testing database 108, and a support platform 110 implementing an automated testing service 112. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise (e.g., software developers, test engineers or other employees, customers or users which may be associated with different ones of the client devices 102) may utilize the automated testing service 112 of the support platform 110 to perform testing of one or more of the IT assets 106 of the IT infrastructure 105. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The testing database 108 is configured to store and record various information that is utilized by the automated testing service 112 of the support platform for testing the IT assets 106 of the IT infrastructure 105. Such information may include, for example, symptom dictionaries, diagnoses dictionaries, dictionaries of matched symptoms and/or matched diagnoses, triage or other test data both at the overall test scenario (e.g., global) level and the individual test suite level, etc. In some embodiments, one or more of storage systems utilized to implement the testing database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110 and/or the automated testing service 112, as well as to support communication between the support platform 110, the automated testing service 112 and other related systems and devices not explicitly shown.

The support platform 110 and/or the automated testing service 112 may be provided as a cloud service that is accessible by one or more of the client devices 102 to allow users thereof to manage testing of the IT assets 106 of the IT infrastructure 105. The client devices 102 may be configured to access or otherwise utilize the support platform 110 and/or the automated testing service 112 to perform testing of one or more of the IT assets 106. In some embodiments, the client devices 102 are assumed to be associated with software developers, test engineers, system administrators, IT managers or other authorized personnel responsible for managing testing for an enterprise. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110 and/or the automated testing service 112 regarding testing of one or more of the IT assets 106 of the IT infrastructure 105. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the automated testing service 112, which includes global-level test configuration analysis logic 114, global-level partial results generation logic 116, test suite-level individual analysis logic 118, and test suite-level results generation logic 120. The automated testing service 112 may perform testing of one or more of the IT assets 106 of the IT infrastructure 105. To do so, the automated testing service 112 may implement a test scenario that involves an initial, "global" stage including test configuration, system installation on one or more of the IT assets 106, cluster configuration for one or more of the IT assets 106, etc., which produces global-level test data for the test scenario. After this initial stage, the test scenario continues with execution of one or more test suites each of which results in production of individual suite-level test data. The global-level test configuration analysis logic 114 is configured to analyze the global-level test data against a database of symptoms and diagnoses (e.g., which may be obtained from the testing database 108) in its own namespace, and the global-level partial results generation logic 116 generates partial results therefrom (e.g., matched-symptoms and/or diagnoses taking into account the global-level test data alone). The global-level partial results generation logic 116 is configured to insert the partial results generated from the global-level analysis into the test data that is used for each individual test suite. The test suite-level individual analysis logic 118 is configured to analyze the test data for each individual test suite in test-level namespaces, while taking into account the partial results inserted by the global-level partial results generation logic 116. The test suite-level results generation logic 120 produces results for each test suite which take into account the partial results, such that a more complete report is generated by the automated testing service 112. Advantageously, this does not require the individual test suites to copy (e.g., through creation of symbolic links or other functionality) and scan all of the global-level data in a combined namespace. Instead, only partial results are taken into account which is faster and saves considerable resources.

At least portions of the automated testing service 112, the global-level test configuration analysis logic 114, the global-level partial results generation logic 116, the test suite-level individual analysis logic 118 and the test suite-level results generation logic 120 may be implemented at least in part in the form of software that is stored in memory and executed by a processor.

It is to be appreciated that the particular arrangement of the client devices 102, the IT infrastructure 105, the testing database 108 and the support platform 110 illustrated in the FIG. 1 embodiment is presented by way of example only, and alternative arrangements can be used in other embodiments. As discussed above, for example, the support platform 110 (or portions of components thereof, such as one or more of the automated testing service 112, the global-level test configuration analysis logic 114, the global-level partial results generation logic 116, the test suite-level individual analysis logic 118 and the test suite-level results generation logic 120) may in some embodiments be implemented internal to one or more of the client devices 102 and/or the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the testing database 108 and the support platform 110 or components thereof (e.g., the automated testing service 112, the global-level test configuration analysis logic 114, the global-level partial results generation logic 116, the test suite-level individual analysis logic 118 and the test suite-level results generation logic 120) may be implemented on respective distinct processing platforms, although numerous other arrangements are possible. For example, in some embodiments at least portions of the support platform 110 and one or more of the client devices 102, the IT infrastructure 105 and/or the testing database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the testing database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 6 and 7.

It is to be understood that the particular set of elements shown in FIG. 1 for using multiple namespaces for analyzing testing data for testing scenarios involving IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for using multiple namespaces for analyzing testing data for testing scenarios involving IT assets will now be described in more detail with reference to the flow diagram of FIG. 2. It is to be understood that this particular process is only an example, and that additional or alternative processes for using multiple namespaces for analyzing testing data for testing scenarios involving IT assets may be used in other embodiments.

In this embodiment, the process includes steps 200 through 210. These steps are assumed to be performed by the support platform 110 utilizing the automated testing service 112, the global-level test configuration analysis logic 114, the global-level partial results generation logic 116, the test suite-level individual analysis logic 118 and the test suite-level results generation logic 120. The process begins with step 200, obtaining a testing data set associated with a test scenario for one or more IT assets. The test scenario comprises a configuration phase and execution of one or more test suites. The testing data set comprises a first portion generated from the configuration phase and one or more additional portions generated from execution of the one or more test suites. The first portion of the testing data set may comprise one or more system configuration files for the one or more IT assets, one or more logs generated from at least one of installation and upgrade of software on the one or more IT assets, etc. The one or more IT assets may comprise a data storage cluster, and the first portion of the testing data set may comprise cluster configuration information for the data storage cluster.

A first data structure is generated in step 202 based at least in part on analyzing the first portion of the testing data set in a first namespace against one or more dictionaries of symptoms and diagnoses. At least one or more components of the first data structure is inserted in step 204 into one or more additional namespaces, each of the one or more additional namespaces comprising a corresponding one of the one or more additional portions of the testing data set generated from execution of one of the one or more test suites. One or more additional data structures are generated in step 206 based at least in part on analyzing the one or more additional portions of the testing data set and the inserted one or more components of the first data structure in the one or more additional namespaces against the one or more dictionaries of symptoms and diagnoses. The first namespace may comprise a top-level directory, and the one or more additional namespaces may comprise sub-directories of the top-level directory. A first one of the one or more test suites may be executed on a first configuration of the one or more IT assets, and a second one of the one or more test suites may be executed on a second configuration of the one or more IT assets, where the first namespace comprises a top-level directory, a first sub-directory for the first configuration of the one or more IT assets, and a second sub-directory for the second configuration of the one or more IT assets. The first data structure and the one or more additional data structures may comprise respective JavaScript Object Notation (JSON) files.

It should be noted that the term "data structure" as used herein is intended to be broadly construed. A data structure, such as any single one of or combination of the first and one or more additional data structures referred to above, may provide a portion of a larger data structure, or any one of or combination of the first and one or more additional data structures may be combinations of multiple smaller data structures. Therefore, the first and one or more additional data structures referred to above may be different parts of a same overall data structure, or one or more of the first and one or more additional data structures could be made up of multiple smaller data structures.

The first data structure may comprise a first binary large object (BLOB) for a given symptom or diagnosis in the one or more dictionaries of symptoms and diagnoses, and at least one of the one or more additional data structures may comprise a second BLOB for the given symptom or diagnosis that is an extension of the first BLOB. Generating a given one of the one or more additional data structures may comprise: identifying a match for a given symptom or diagnosis in the one or more dictionaries of symptoms and diagnoses in a given one of the one or more additional portions of the testing data set; determining whether the first data structure includes a match for the given symptom or diagnosis; responsive to determining that the first data structure does not include a match for the given symptom or diagnosis, creating a new BLOB in the given additional data structure for the given symptom or diagnosis; and responsive to determining that the first data structure includes a match for the given symptom or diagnoses, extending an existing BLOB from the first data structure and inserting the extended BLOB in the given additional data structure.

Figure 2:
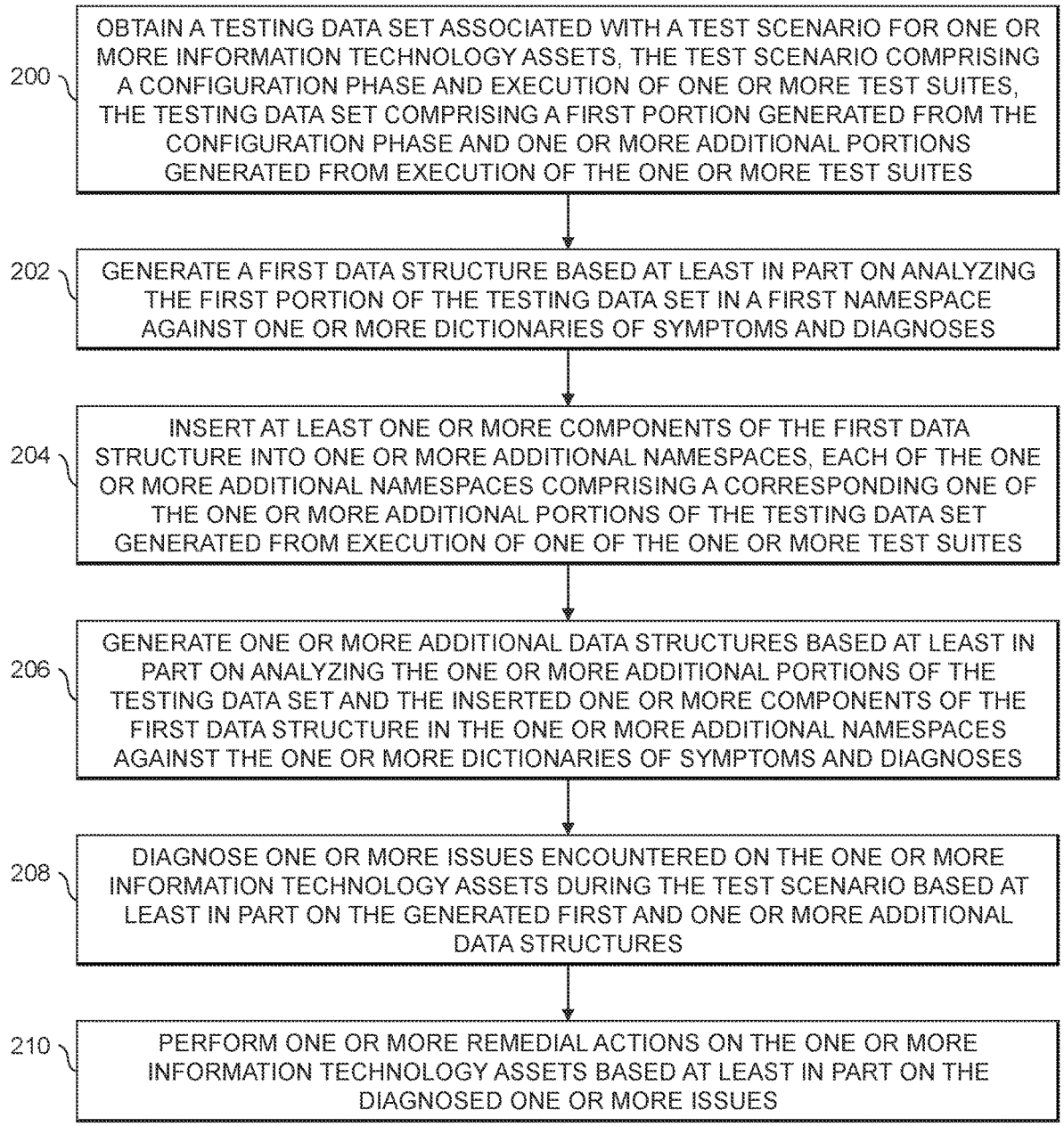
FIG. 2 is a flow diagram of an exemplary process for using multiple namespaces for analyzing testing data for testing scenarios involving information technology assets in an illustrative embodiment.

The FIG. 2 process continues with step 208, diagnosing one or more issues encountered on the one or more IT assets during the test scenario based at least in part on the generated first and one or more additional data structures. One or more remedial actions are performed on the one or more IT assets in step 210 based at least in part on the diagnosed one or more issues. Step 210 may comprise determining whether the diagnosed one or more issues exhibit at least a threshold level of similarity to one or more reference cases. Responsive to determining that the diagnosed one or more issues exhibit at least the threshold level of similarity to at least one of the one or more reference cases, the one or more remedial actions may comprise applying one or more changes to at least one of a hardware configuration and a software configuration of at least one of the one or more IT assets, the one or more changes being selected based at least in part on said at least one of the one or more reference cases exhibiting at least the threshold level of similarity with the diagnosed one or more issues. The one or more remedial actions may further comprise updating said at least one of the one or more reference cases exhibiting at least the threshold level of similarity with the diagnosed one or more issues. Responsive to determining that the diagnosed one or more issues do not exhibit at least the threshold level of similarity to at least one of the one or more reference cases, the one or more remedial actions may comprise: opening a new reference case; investigating the new reference case to determine one or more changes to at least one of a hardware configuration and a software configuration of at least one of the one or more IT assets which remedy the diagnosed one or more issues; and applying the determined one or more changes to said at least one of the hardware configuration and the software configuration of said at least one of the one or more IT assets.

When people analyze logs to triage problems found in testing, they look for patterns and take actions according to matches which are found. Automated triage service analysis may similarly look for patterns in triage data, and then take actions based on a set of preconfigured patterns and actions. The search for patterns happens in triage data. The triage data is generated through automated testing, and may also be referred to as test results data or testing data. The automated testing often entails initial setup, global configuration, and then operation of separate test suites in individual windows of time, which at the end may result in one or more failures of interest. Suitable and accurate analysis combines global factors from setup and configuration with time-sensitive factors from the time windows of the individual test suites. It is generally misleading and inaccurate to combine factors from two windows of time. Excluding global factors may lead to inaccurate or incomplete results at any time (e.g., any individual time window in which a test suite is run). Combining global factors of analysis with separate time-sensitive analyses, in a series, is difficult.

Conventional approaches may feed selected global triage data into each time-sensitive analysis (e.g., each individual test suite), where such global triage data may be analyzed accurately but redundantly which takes extra time and resources. Further, the procedure for selecting the global triage data is slow and scales poorly as more items are added to the selection. The specification of items to add to the selection may be configured in source code which is expensive to maintain.

In illustrative embodiments, technical solutions are provided which utilize separate analytical namespaces to facilitate combining triage results, rather than combining triage data into a single namespace. Global triage data is analyzed in its own namespace first, and pattern-finding results of the global analysis may stand alone. The technical solutions further insert the pattern-finding results of the global analysis as partial results into each time-sensitive analysis, so that each test suite's analysis includes and takes into account global factors. Advantageously, the technical solutions described herein eliminate the need to select global items to feed into time-sensitive analyses, so that procedure may be skipped. Further, the configuration of such procedures in source code may also be skipped saving considerable time, effort and resources. Further, the overall automated triage service becomes easier to comprehend and maintain, and no new triage patterns would require code changes. For end-users of an automated triage service configured using the technical solutions described herein, the service will more effectively support their specification of global patterns found in infrastructure details, system initialization, and general configuration, along with their specification of time-sensitive or test suite-specific patterns found in test details, event flows and host actions. The automated triage service configured using the technical solutions described herein is thus able to apply all patterns naturally in separate namespaces of triage data.

The technical solutions described herein provide a novel approach for automated triage services, which overcome technical problems with conventional triage services. An automated triage service may be configured with symptoms and diagnoses for various issues. A symptom encodes a pattern to match in a file (e.g., a log file, a configuration file, etc.) by an expected name. If the pattern is found in the expected file, then the symptom is said to match. A diagnosis asserts a match to a reference case because of having one or a few specific symptoms matched. If the diagnosis itself is a match, it takes a corresponding action, such as marking a current bug or issue (e.g., a Jira bug) as a duplicate of the reference cases. A diagnosis can be written to take any of several possible remedial actions. Symptoms and diagnoses may be written by subject matter experts who are experienced in triaging test failures.

The first step in automated triage analysis is to obtain access to a whole set of triage data, and superficially search for evidence of subsets of data corresponding to automated runs of individual test suites in respective windows of time. The technical solutions described herein make a list of each subset of triage data, since each may constitute a separate namespace for triage analysis. The next step in the automated triage analysis is to prepare the global namespace, and each of the discovered subsets on the list for triage analysis. This may include, for example, creating output directories for reports and preparing input files for text-based scanning. The automated triage analysis may continue with performing a complete analysis of scanning only the global files for symptoms, and evaluating any found symptoms for diagnoses to produce analysis reports. Such analysis reports are comprehensive for the global namespace, but are based on a broad and shallow view of the triage data (e.g., on the global data only). A JavaScript Object Notation (JSON) file representing the symptoms matched at this level of the analysis may be copied into each subset on the list. As the automated triage service processes the list of subsets, it performs a complete analysis on each. During each analysis, however, an additional step is taken to preload the list of matched symptoms with the symptoms found at the global level by reading the copied JSON file. The evaluation of diagnoses in each subset's namespace works with a combination of symptoms found in the individual test suite's namespace and the symptoms found at the global level. Each report therefore reflects a union of two namespaces in its analysis. The automated triage service may compare, evaluate and summarize the reports across subsets with the global report, and produces its final report and takes any final actions.

Conventional approaches for automated triage services may be configured with symptoms and diagnoses, where the symptoms encode patterns to be matched and the diagnoses assert matches to reference cases based on whether the diagnoses have one or a few specific symptoms matched thereto. A conventional automated triage service may obtain access to the whole set of triage data, and superficially search for evidence of one or a few subsets of data corresponding to automated runs of individual test suites in respective windows of time. The conventional automated triage service visits each subset of the triage data and augments it with copies or links to selected global triage files or directories, which it has to locate by name slowly with a global search. As it visits each subset, the conventional automated triage service performs a complete analysis of scanning files for symptoms, including the global files, and evaluating symptoms for diagnoses to produce analysis reports. Finally, the conventional automated triage service compares, evaluates and summarizes the analysis reports across subsets and produces a final report and takes final actions (e.g., in Jira or some other bug tracking tool).

Conventional automated triage services suffer from various technical problems, including that conventional automated triage services have to make links to directories (e.g., with global triage files) to make them appear in the namespace used for individual test suites. This, however, can mislead other tools or services which work with the same triage data for other purposes. Further, design assumptions about the triage data layout could be violated by these extensions to the namespace. In addition, having the same (potentially large) data files appear in multiple places can often lead to slow processing.

Additional technical problems with conventional automated triage services include that links to directories can break calculations of relative paths between items in the file system. For example, a link near the top of a tree to a point deep in the tree could trick a reading process into calculating a short relative path to the top of the tree, when the true relative path is many levels up to the top. While code may be implemented to mitigate this confusion, such code may be difficult to understand, maintain and update. The technical solutions described herein advantageously eliminate such directory links.

Conventional automated triage services may also suffer from technical problems resulting from treating all triage data in one global analysis. Such analysis is broad and deep, but is slow and indiscriminate in combining patterns found in distinct runs in separate windows of time (e.g., as though they had happened in the same context), which leads to misleading and inaccurate results.

The technical solutions described herein provide automated triage services which are configured to perform automated triage of large collections of triage data for failure analysis, and benefit from making an initially shallow scan globally across the triage data before doing one or more selected deep scans and combining the results for overall analysis. The initial analysis might, in some cases, be sufficient to end the automated triage quickly. The initial analysis, for example, encompasses global factors and enables deep scans to narrow their focus for efficiency without losing global factors in the combined analysis.

Illustrative embodiments provide technical solutions enabling a coordinated redesign of first and last stages of a processing pipeline for a triage service that provides rule-based failure analysis of triage data obtained from automated testing of IT infrastructure, such as IT infrastructure including IT assets providing complex data storage appliances. Such IT assets are tested over a period of time (e.g., hours or even days), and generate a large data set of system logs, installation and upgrade logs, host logs, test logs, system configuration files, etc. This large data set may be referred to as a test or triage data set.

In some embodiments, the large data set manifests an overall test scenario which includes: test configuration, system installation and cluster configuration; executing of one or more test suites; and test scenario data collection and cluster shutdown. The execution of the one or more test suites may include execution of N test suites in a sequential fashion. The first test suite may be executed, followed by conclusion of the first test suite and data collection for the first test suite. The second test suite may then be executed, followed by conclusion of the second test suite and data collection for the second test suite. This continues for all N test suites.

A triage service may be designed to perform one analysis in one namespace. If the namespace is the whole scenario above, the triage service may inaccurately mix attributes across the different test suites. Alternatively, if the namespace is separate for each test suite, then attributes would be incomplete since they would lack overall scenario features like test configuration, system installation, etc.

Performing triage for IT infrastructure failure analysis may be analogized to failure analysis for passenger planes. Suppose a passenger plane is prepared and boarded in an origin city, and is scheduled to fly to a destination city with two stops along the way. The passenger plane uneventfully flies to the first stop, exchanges some passengers and cargo, gets refueled, and flies safely to the second stop where it gets more passengers and fuel. Further suppose that, on approach to the destination city, the passenger plane crashes. In failure analysis for this scenario, the salient factors would combine details of the last leg of the journey (e.g., from the second stop to the destination city) with overall factors for the trip as a whole, such as the model and age of the passenger plane, crew experience and health, etc. Nearly all the details of the first two legs of the journey (e.g., from the origin city to the first stop, and from the first stop to the second stop) may be excluded from the analysis. Any leg of the journey could be analyzed in isolation of other legs, but should always include overall factors. In a sense, each leg of the journey is a separate flight, and the three flights (origin city to the first stop, the first stop to the second stop, the second stop to the destination city) share some overall factors but no flight details. Testing IT infrastructure using multiple test suites presents similar challenges, in that each test suite may be considered separately but should take into account at least some global factors or other information. In illustrative embodiments, the technical solutions introduce multiple namespaces for the whole analysis, and provide functionality for combining accurate analytical results pairwise for overall scenario attributes and each test suite's attributes. By analogy, the technical solutions use separate namespaces to bring overall factors into the analysis of each flight.

When something interestingly fails during automated testing of complex data storage devices or other types of IT assets in an IT infrastructure, people and machines need to collect all the triage data, scan for known patterns to build evidence, associate symptoms of problems with points in time, order events, and construct evidence-based cases for the most suitable diagnoses, among many possibilities. In a triage service, each such diagnosis specifies one or more appropriate actions to take when the diagnosis matches the evidence as indicated by the symptoms. Such actions may include, but are not limited to: marking the case as a duplicate instance of an already investigated problem; treating the case as a new problem and assigning it to a specialized team to investigate or fix; treating the case as uncertain but comment on how it belongs to a category of problems; treating the case as undetermined but list the symptoms of the problem to guide triage engineers; etc.

In some cases, triage services may originally be developed for a product or IT asset that produces small, predictable data sets from its automated testing. The triage service may apply its analysis once on each data set directly, and obtain a reported result taking diagnostic action when appropriate. The triage service in such cases can save engineering time, handle mundane cases, and provide clues in interesting cases. With such success, the triage service may be applied for more complex products or IT assets (or collections of IT assets) which produce large, unpredictable data sets from testing of the complex products or IT assets. Focus may be placed on test suites, so the triage service may be designed to visit each test suite's data collection and analyze it alone. At first, only human analysis could include attributes from an overall scenario, such as issues during installation, cluster configuration, etc.

When this approach produces incomplete results, the triage service may be configured to modify the namespace of each test suite's data collection to make it appear to contain copies of the overall scenario's data files, such that overall scenario attributes (also referred to as global attributes or information) could be included in each test suite's analysis. The modified namespaces can be used by the triage service to produce nearly complete results, but presents multiple technical problems. Such technical problems include that analyzing additional files in scenario data calls for additions to the source code that modifies namespaces—in other words, expanded analysis requires new deployment of the triage service. The technical problems also include that, if a test scenario fails early (e.g., before starting a test suite), there is no test suite data so the triage service finds no location to run its analysis and must abort its efforts. Further, modifications to the namespaces include symbolic links to directories, which presents technical problems in that such links may mislead people working with the data afterwards, and may also confuse unrelated services that process the same data. In addition, the overall scenario data files are scanned for the same patterns redundantly since the overall scenario data files are included in the analysis of each individual test suite.

The technical solutions in some embodiments utilize multiple analytical namespaces to combine triage results, rather than combining triage data into a single namespace. Overall scenario data is analyzed in its own namespace first. The pattern-finding results of the overall scenario-level analysis may stand alone. The technical solutions also insert the pattern-finding results from the overall scenario-level analysis as partial results into each test suite's data analysis, so that each test suite's analysis can take into account overall attributes (e.g., the pattern-finding results of the overall scenario-level analysis).

Figure 3:
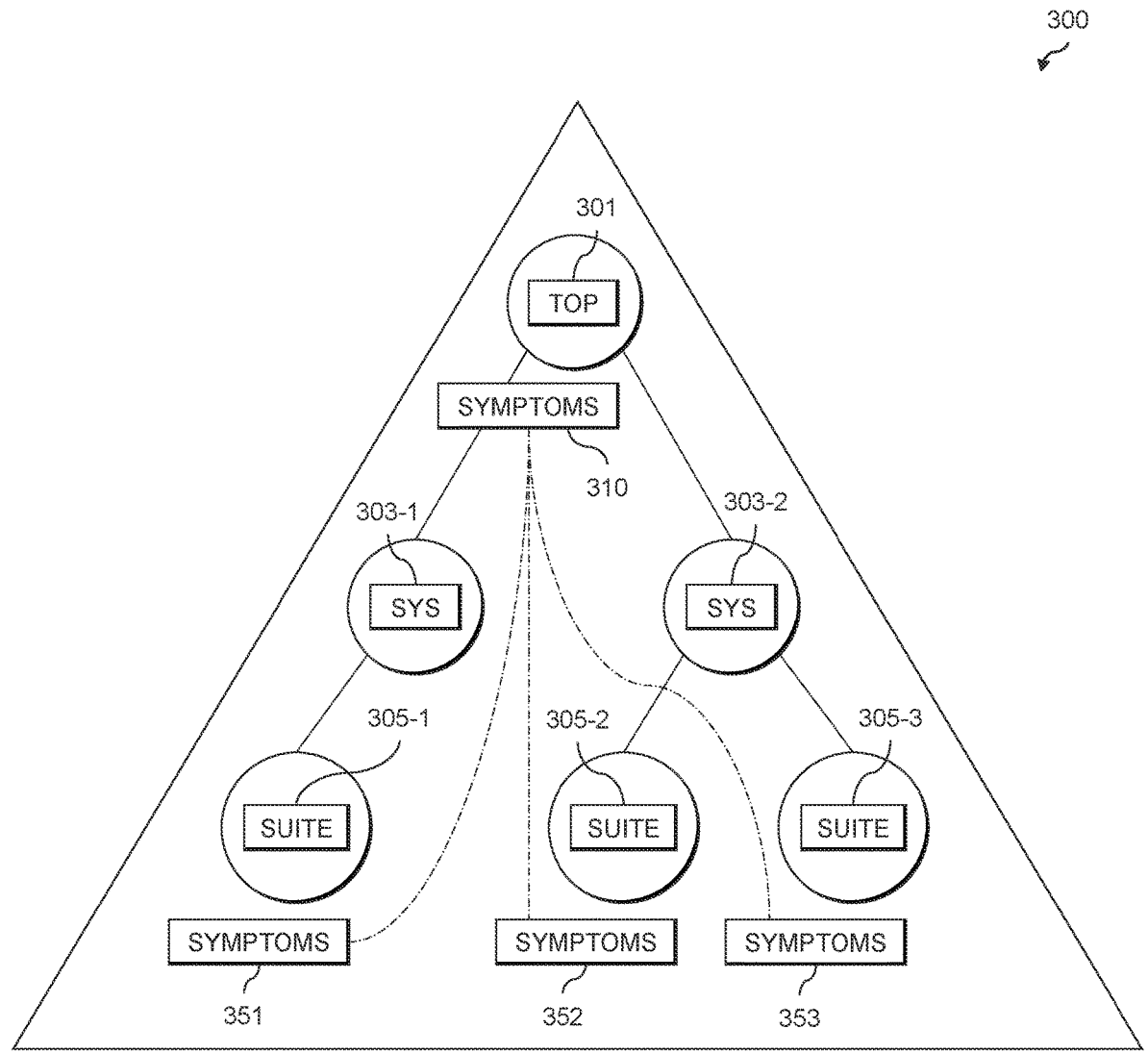
FIG. 3 shows a process flow for performing testing using analysis in multiple namespaces in an illustrative embodiment.

FIG. 3 shows an overall view of an analysis process 300, which runs at a top level 301 (e.g., the overall scenario level) to produce a set of overall symptoms 310 (e.g., pattern-finding results). Here, the suite-level analysis may run on different configurations of a system, shown as sys 303-1 and sys 303-2. The suite-level analysis includes a first test suite 305-1 which runs on the system configuration sys 303-1 and produces test symptoms 351, a second test suite 305-2 which runs on the system configuration sys 303-2 and produces test symptoms 352, and a third test suite 305-3 which runs on the system configuration sys 303-2 and produces test symptoms 353. Here, the overall symptoms 310 are inserted into the test symptoms 351, 352 and 353. The analysis process 300 starts at the top level 301 of the directory of triage data. Scenario data files are located at or near the top level 301, so identifying overall symptoms 310 in the analysis process 300 entails locating files in the top level 301 that match symptom-defined file patterns and scanning those files for symptom-defined signature patterns. The manually written file patterns and signature patterns may come from a dictionary, which has been loaded from, for example, a JavaScript Object Notation (JSON) file.

Figure 4A:
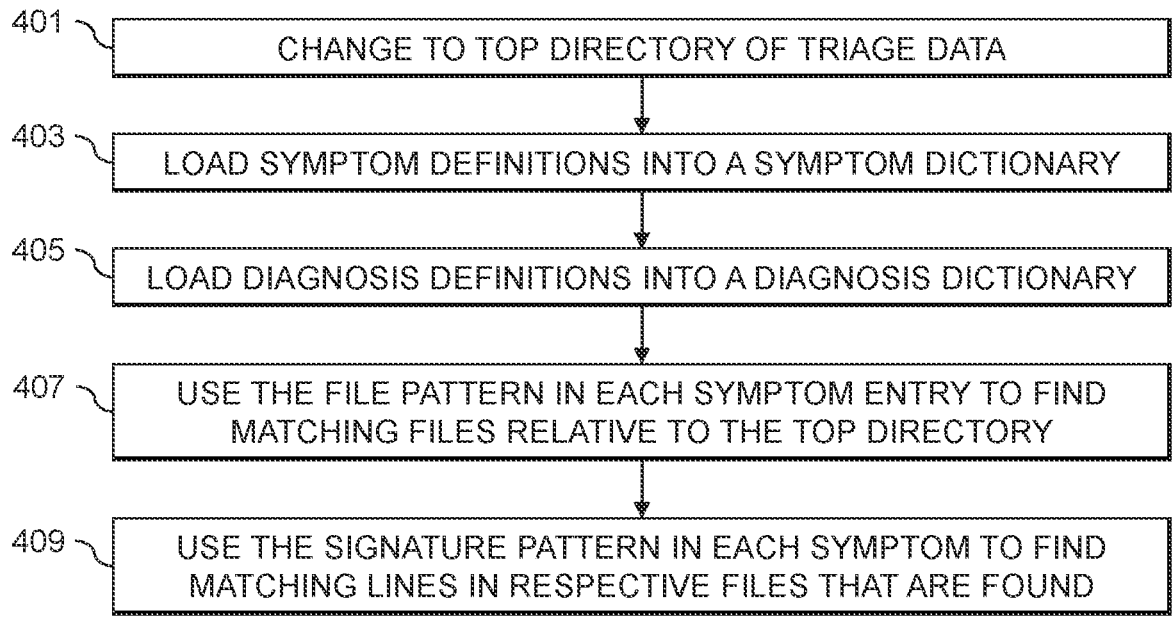
FIGS. 4A-4D show process flows for performing testing using a top-level analysis in a first namespace in an illustrative embodiment.

FIGS. 4A-4D show different portions of a process flow for executing the analysis process 300. As shown in FIG. 4A, the top-level analysis may begin in step 401 with changing to a top directory of triage data (e.g., using a change directory or cd command). In step 403, symptom definitions are loaded (e.g., from a JSON file) into a symptom dictionary. In step 405, diagnosis definitions are loaded (e.g., from a JSON file) into a diagnosis dictionary. The file patterns in each symptom entry in the symptom dictionary are used in step 407 to find matching files relative to the top directory. The signature pattern in each symptom is used in step 409 to find matching lines in the files which are found in step 407.

Figure 4B:
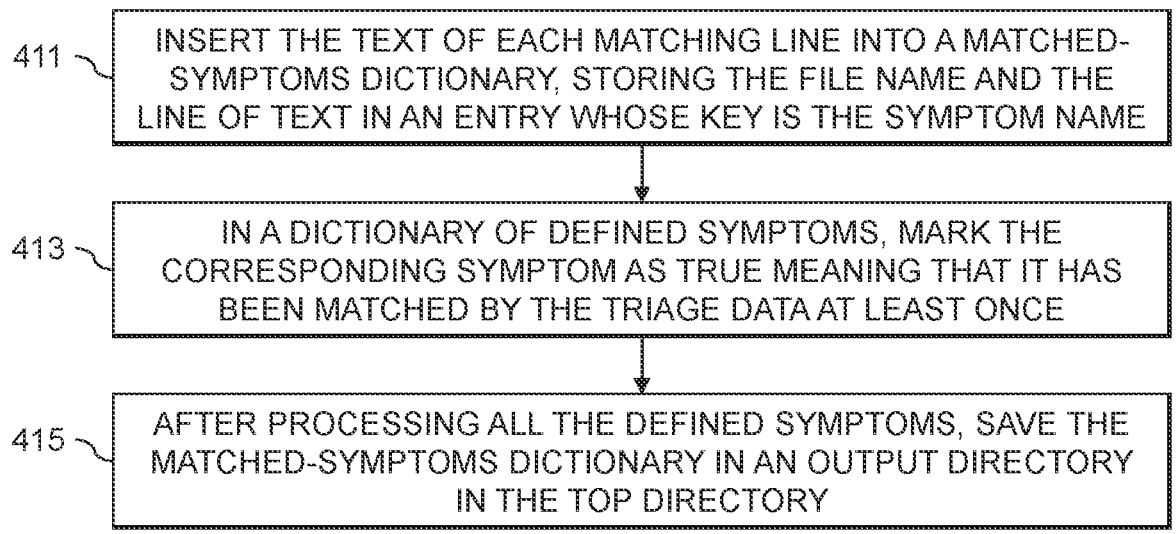

Each time a line in a data file matches a signature pattern, that line is inserted into a dictionary indexed by symptom names. When all suitable files have been scanned for signatures, the dictionary of matched symptoms is saved (e.g., as a JSON file). Such processing is illustrated in FIG. 4B, which begins in step 411 with inserting the text of each matching line into a matched-symptoms dictionary. To do so, the file name and the line of text is stored in an entry of the matched-symptoms dictionary, the entry having a key that is the symptom name. In step 413, the corresponding symptom in the dictionary of defined symptoms (e.g., loaded in step 403) is marked as "True," meaning that it has been matched by the data at least once. After processing all of the defined symptoms in the symptom dictionary, the matched-symptoms dictionary is saved in step 415 (e.g., as a JSON file) in an output directory in the top directory.

Figure 4C:
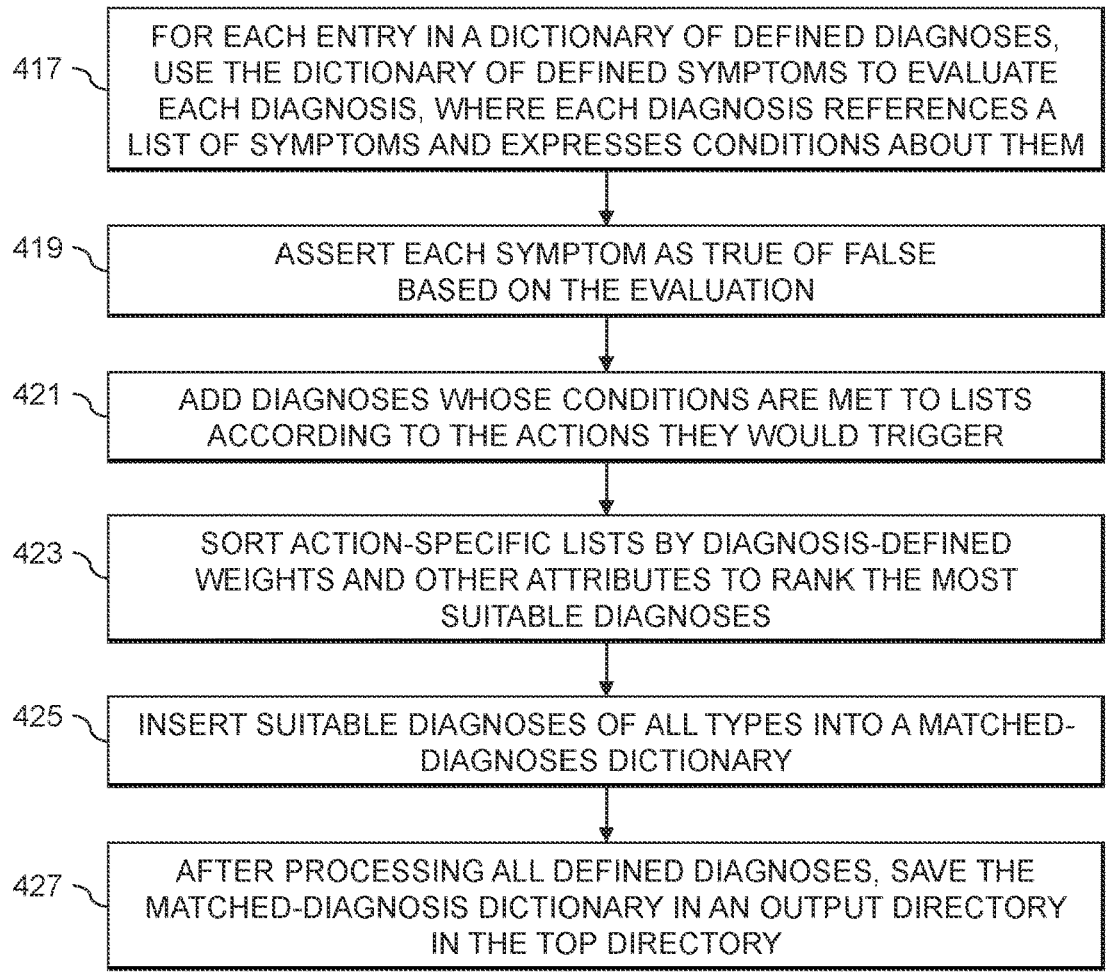

The set of matched symptoms is used to evaluate the diagnoses (e.g., which may include manually written diagnoses) which come from the diagnosis dictionary (e.g., loaded in step 405). An interim report is generated to list the matched symptoms and most suitable diagnoses, if any. Such processing is illustrated in FIG. 4C, which begins in step 417 where, for each entry in the dictionary of defined diagnoses (e.g., loaded in step 405), the dictionary of defined symptoms (e.g., loaded in step 403) is used to evaluate a corresponding diagnosis. Each diagnosis references a list of symptoms, and expresses conditions about them. In step 419, each symptom is asserted as "True" or "False" based on the evaluation in step 417. Diagnoses whose conditions are met are added to lists in step 421 according to the actions they would trigger. The action-specific lists are sorted by diagnosis-defined weights and other attributes to rank the most suitable diagnoses in step 423. Suitable diagnoses of all types are inserted into a matched-diagnoses dictionary in step 425. After processing all defined diagnoses, the matched-diagnoses dictionary is saved in step 427 (e.g., as a JSON file) in an output directory in the top directory.

Figure 4D:
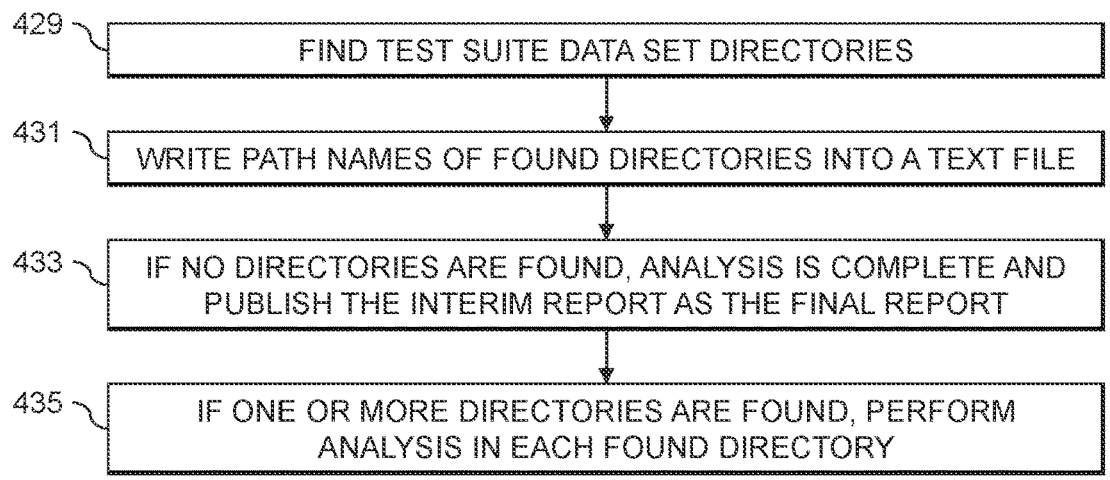

The algorithms may search deeper in the tree of triage data for data sets from individual test suites. If there are none, the interim report gets published as the final report. If there are data sets from the test suites, the algorithm copies the matched symptoms from the top-level analysis (e.g., the matched-symptoms dictionary and the matched-diagnoses dictionary) into each test suite's data set directory. This enables the seeding of each suite-level analysis with partial results, representing scenario-level attributes as matched symptoms. Such processing is illustrated in FIG. 4D, which begins in step 429 with finding the test suite data set directories. In step 431, path names of the found test suite data set directories are written into a text file. If no test suite data set directories are found, the analysis is complete and the interim report is published in step 433 as the final report. Otherwise, if one or more test suite data set directories are found, the analysis is performed in each of the found test suite data set directories in step 435. Such test suite level analysis is described in further detail below.

Test suite level analysis will now be described with respect to the pseudocode 500 and 505 shown in FIGS. 5A and 5B. The pseudocode 500 in FIG. 5A shows a code snippet in which a JSON file with the overall scenario level symptoms is "xray_detail.json" and an individual test suite's data set directory is "service-data directory" with variables "ps_dir" and "full_ps_dir." The JSON file is copied and renamed, so it will not be confused with a locally generated JSON file of matched symptoms.

The algorithm goes to each test suite's data set directory and performs nearly the same analytical steps, using the same definitions of symptoms and diagnoses loaded from respective JSON files. A key difference is that the technical solutions described herein copy the matched-symptoms JSON file from the top level analysis into each test suite's data set directory—this set of matched symptoms is used to initialize the dictionary of matched symptoms for the analysis of each test suite's data set. The pseudocode 505 of FIG. 5 shows how each pattern-matching line is handled with care as it enters the dictionary of matched symptoms, avoiding the overwriting of entries populated from the prior analysis performed in the top directory. For populated entries, new content is extended not inserted. Consequently, the evaluation of diagnoses includes overall scenario-level symptoms. It should be noted that each time the algorithm visits a distinct directory, it encounters a separate namespace. The defined symptom file patterns are the same everywhere, but the files that match the patterns in each namespace are different, and these are the files that are scanned for signatures.

Interim results are produced in each test suite data set directory that is analyzed. To conclude, the algorithm evaluates the interim results for the overall test scenario at the top and for each test suite below, and selects the most suitable to publish as the final report. The triage service compares the interim results across test suites, and selects the most suitable to publish, thereby inserting the top-level interim results into the list of comparisons.

The technical solutions described herein advantageously provide faster performance for a triage service than conventional approaches, because the technical solutions can dispense with several slow "find" operations over Network File System (NFS) that enable the making of symbolic links which are no longer needed. The performance improvement depends, in part, on the size of the tree of triage data as well as the number of modifications patterns made to the namespace (as the scope of analysis grows, more "find" operations are necessary in conventional approaches). The technical solutions, while providing performance improvements in the triage service, do not result in decreased accuracy as the lists of matching symptoms and selected diagnoses are the same. The technical solutions, through combining matched symptoms generated from multiple namespaces, results in the same list of matched symptoms as symbolically combining the multiple namespaces into one before generating the list of matched symptoms. Either way, diagnoses are evaluated on the same list of matched symptoms.

The technical solutions described herein provide a novel approach for generating lists of matched symptoms, without requiring manipulation of the namespace to create a combined data set for one analysis. Instead, the technical solutions perform direct analyses in multiple namespaces, with the first results (e.g., for an overall scenario using global data) feeding into subsequent analyses (e.g., for individual test suites) to create combined results. Dropping the manipulation of the namespace (e.g., through the creation of symbolic links and combining all the data resulting in redundant processing) simplifies comprehension, maintenance and extension of the scope of analysis.

The technical solutions described herein use multiple analytical namespaces to combine triage results, rather than combining all triage data into one namespace. Global or overall test scenario triage data is analyzed in its own namespace first. The pattern-finding results of the global analysis may stand alone, and are also inserted as partial results into each individual test suite's analysis such that each test suite's analysis includes and takes into account global attributes. The overall triage service is thus easier to comprehend and maintain. Further, no new triage patterns require code changes; all triage patterns may be defined naturally through configuration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for using multiple namespaces for analyzing testing data for testing scenarios involving IT assets will now be described in greater detail with reference to FIGS. 6 and 7. Although described in the context of system 100, these platforms may also be used to implement at least portions of other information processing systems in other embodiments.

Figure 6:
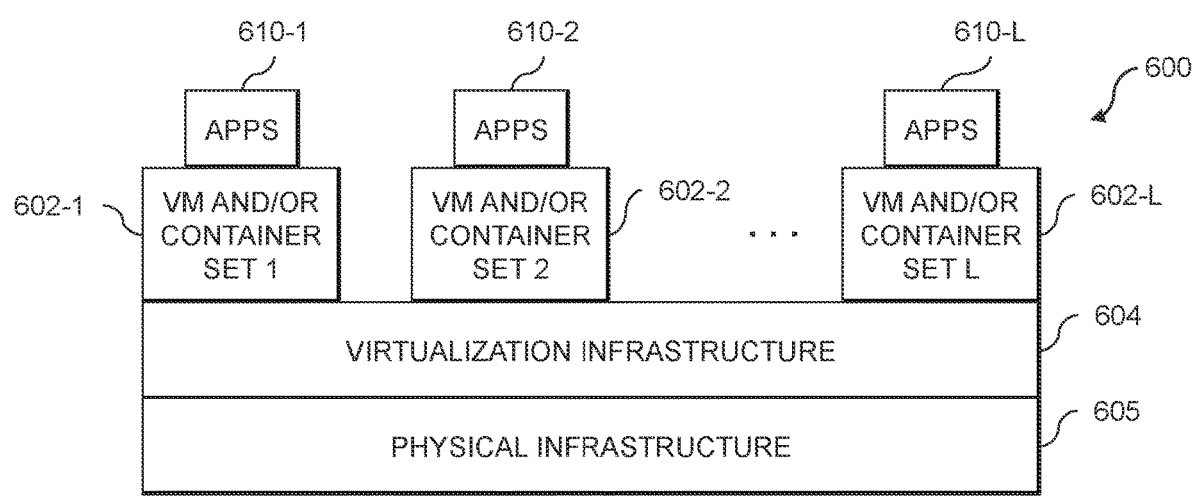
FIGS. 6 and 7 show examples of processing platforms that may be utilized to implement at least a portion of an information processing system in illustrative embodiments.
Figure 7:
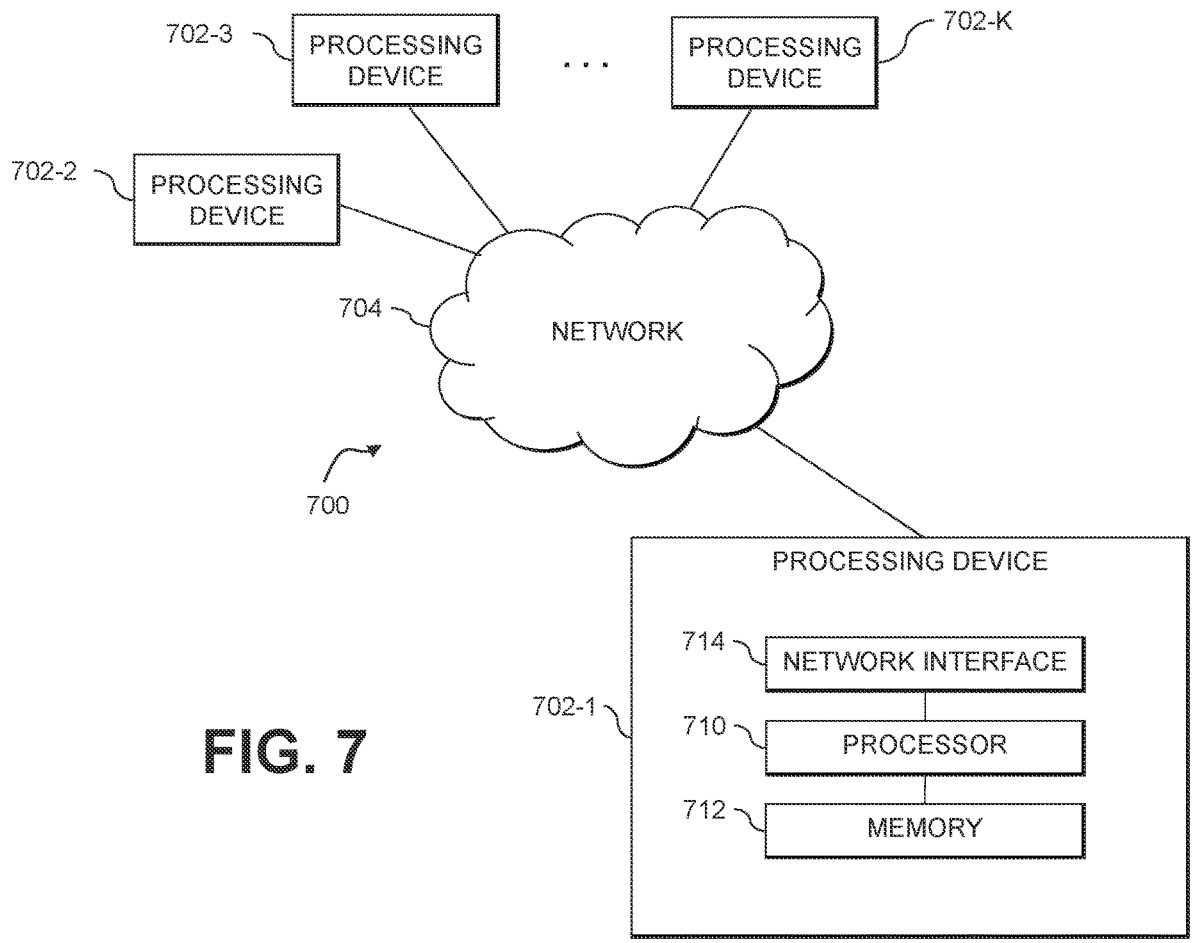

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU)

or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for using multiple namespaces for analyzing testing data for testing scenarios involving IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
      to obtain a testing data set associated with a test scenario for one or more information technology assets, the test scenario comprising a configuration phase and execution of one or more test suites, the testing data set comprising a first portion generated from the configuration phase and one or more additional portions generated from execution of the one or more test suites;
      to generate a first data structure based at least in part on analyzing the first portion of the testing data set in a first namespace against one or more dictionaries of symptoms and diagnoses;
      to insert at least one or more components of the first data structure into one or more additional namespaces, each of the one or more additional namespaces comprising a corresponding one of the one or more additional portions of the testing data set generated from execution of one of the one or more test suites;
      to generate one or more additional data structures based at least in part on analyzing the one or more additional portions of the testing data set and the inserted one or more components of the first data structure in the one or more additional namespaces against the one or more dictionaries of symptoms and diagnoses;
      to diagnose one or more issues encountered on the one or more information technology assets during the test scenario based at least in part on the generated first and one or more additional data structures; and
      to perform one or more remedial actions on the one or more information technology assets based at least in part on the diagnosed one or more issues.

2. The apparatus of claim 1 wherein the first namespace comprises a top-level directory, and wherein the one or more additional namespaces comprises sub-directories of the top-level directory.

3. The apparatus of claim 1 wherein a first one of the one or more test suites is executed on a first configuration of the one or more information technology assets, and a second one of the one or more test suites is executed on a second configuration of the one or more information technology assets.

4. The apparatus of claim 3 wherein the first namespace comprises a top-level directory, a first sub-directory for the first configuration of the one or more information technology assets, and a second sub-directory for the second configuration of the one or more information technology assets.

5. The apparatus of claim 1 wherein the first data structure and the one or more additional data structures comprise respective JavaScript Object Notation (JSON) files.

6. The apparatus of claim 1 wherein the first data structure comprises a first binary large object for a given symptom or diagnosis in the one or more dictionaries of symptoms and diagnoses, and wherein at least one of the one or more additional data structures comprises a second binary large object for the given symptom or diagnosis that is an extension of the first binary large object.

7. The apparatus of claim 1 wherein generating a given one of the one or more additional data structures comprises:

identifying a match for a given symptom or diagnosis in the one or more dictionaries of symptoms and diagnoses in a given one of the one or more additional portions of the testing data set;
determining whether the first data structure includes a match for the given symptom or diagnosis;
responsive to determining that the first data structure does not include a match for the given symptom or diagnosis, creating a new binary large object in the given additional data structure for the given symptom or diagnosis; and
responsive to determining that the first data structure includes a match for the given symptom or diagnoses, extending an existing binary large object from the first data structure and inserting the extended binary large object in the given additional data structure.

8. The apparatus of claim 1 wherein the first portion of the testing data set comprises one or more system configuration files for the one or more information technology assets.

9. The apparatus of claim 1 wherein the first portion of the testing data set comprises one or more logs generated from at least one of installation and upgrade of software on the one or more information technology assets.

10. The apparatus of claim 1 wherein the one or more information technology assets comprises a data storage cluster, and wherein the first portion of the testing data set comprises cluster configuration information for the data storage cluster.

11. The apparatus of claim 1 wherein performing the one or more remedial actions on the one or more information technology assets comprises determining whether the diagnosed one or more issues exhibit at least a threshold level of similarity to one or more reference cases.

12. The apparatus of claim 11 wherein responsive to determining that the diagnosed one or more issues exhibit at least the threshold level of similarity to at least one of the one or more reference cases, the one or more remedial actions comprise applying one or more changes to at least one of a hardware configuration and a software configuration of at least one of the one or more information technology assets, the one or more changes being selected based at least in part on said at least one of the one or more reference cases exhibiting at least the threshold level of similarity with the diagnosed one or more issues.

13. The apparatus of claim 12 wherein the one or more remedial actions further comprises updating said at least one of the one or more reference cases exhibiting at least the threshold level of similarity with the diagnosed one or more issues.

14. The apparatus of claim 11 wherein responsive to determining that the diagnosed one or more issues do not exhibit at least the threshold level of similarity to at least one of the one or more reference cases, the one or more remedial actions comprise:
opening a new reference case;
investigating the new reference case to determine one or more changes to at least one of a hardware configuration and a software configuration of at least one of the one or more information technology assets which remedy the diagnosed one or more issues; and
applying the determined one or more changes to said at least one of the hardware configuration and the software configuration of said at least one of the one or more information technology assets.

15. A computer program product comprising a non-transitory processor-readable storage medium having stored therein program code of one or more software programs, wherein the program code when executed by at least one processing device causes the at least one processing device:
to obtain a testing data set associated with a test scenario for one or more information technology assets, the test scenario comprising a configuration phase and execution of one or more test suites, the testing data set comprising a first portion generated from the configuration phase and one or more additional portions generated from execution of the one or more test suites;
to generate a first data structure based at least in part on analyzing the first portion of the testing data set in a first namespace against one or more dictionaries of symptoms and diagnoses;
to insert at least one or more components of the first data structure into one or more additional namespaces, each of the one or more additional namespaces comprising a corresponding one of the one or more additional portions of the testing data set generated from execution of one of the one or more test suites;
to generate one or more additional data structures based at least in part on analyzing the one or more additional portions of the testing data set and the inserted one or more components of the first data structure in the one or more additional namespaces against the one or more dictionaries of symptoms and diagnoses;
to diagnose one or more issues encountered on the one or more information technology assets during the test scenario based at least in part on the generated first and one or more additional data structures; and
to perform one or more remedial actions on the one or more information technology assets based at least in part on the diagnosed one or more issues.

16. The computer program product of claim 15 wherein the first namespace comprises a top-level directory, and wherein the one or more additional namespaces comprises sub-directories of the top-level directory.

17. The computer program product of claim 15 wherein the first data structure comprises a first binary large object for a given symptom or diagnosis in the one or more dictionaries of symptoms and diagnoses, and wherein at least one of the one or more additional data structures comprises a second binary large object for the given symptom or diagnosis that is an extension of the first binary large object.

18. A method comprising:
obtaining a testing data set associated with a test scenario for one or more information technology assets, the test scenario comprising a configuration phase and execution of one or more test suites, the testing data set comprising a first portion generated from the configuration phase and one or more additional portions generated from execution of the one or more test suites;
generating a first data structure based at least in part on analyzing the first portion of the testing data set in a first namespace against one or more dictionaries of symptoms and diagnoses;
inserting at least one or more components of the first data structure into one or more additional namespaces, each of the one or more additional namespaces comprising a corresponding one of the one or more additional portions of the testing data set generated from execution of one of the one or more test suites;
generating one or more additional data structures based at least in part on analyzing the one or more additional portions of the testing data set and the inserted one or more components of the first data structure in the one or more additional namespaces against the one or more dictionaries of symptoms and diagnoses;

diagnosing one or more issues encountered on the one or more information technology assets during the test scenario based at least in part on the generated first and one or more additional data structures; and performing one or more remedial actions on the one or more information technology assets based at least in part on the diagnosed one or more issues;

wherein the method is performed by at least one processing device comprising a processor coupled to a memory.

19. The method of claim 18 wherein the first namespace comprises a top-level directory, and wherein the one or more additional namespaces comprises sub-directories of the top-level directory.

20. The method of claim 18 wherein the first data structure comprises a first binary large object for a given symptom or diagnosis in the one or more dictionaries of symptoms and diagnoses, and wherein at least one of the one or more additional data structures comprises a second binary large object for the given symptom or diagnosis that is an extension of the first binary large object.

* * * * *